United States Patent
Adams

(10) Patent No.: US 9,959,026 B2
(45) Date of Patent: May 1, 2018

(54) SPREAD-TO-DUPLICATE AND PINCH-TO-DELETE GESTURES

(71) Applicant: Adobe Systems Incorporated

(72) Inventor: Robin James Adams, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 580 days.

(21) Appl. No.: 14/166,546

(22) Filed: Jan. 28, 2014

(65) Prior Publication Data

US 2015/0212711 A1    Jul. 30, 2015

(51) Int. Cl.
  *G06F 3/0481*    (2013.01)
  *G06F 3/0484*    (2013.01)
  *G06F 3/0482*    (2013.01)
  *G06F 3/0488*    (2013.01)

(52) U.S. Cl.
  CPC ........ *G06F 3/04845* (2013.01); *G06F 3/0482* (2013.01); *G06F 3/04883* (2013.01)

(58) Field of Classification Search
  CPC .... G06F 3/0482; G06F 3/017; G06F 3/04883; G06F 3/04845; G06F 3/041; G06F 3/04817; G06F 3/0484
  USPC ................. 715/863, 788; 345/173
  See application file for complete search history.

(56) References Cited

U.S. PATENT DOCUMENTS

| | | | |
|---|---|---|---|
| 2010/0162179 A1* | 6/2010 | Porat | G06F 3/0481 715/863 |
| 2011/0205171 A1* | 8/2011 | Akiyoshi | G06F 3/04883 345/173 |
| 2011/0221678 A1* | 9/2011 | Davydov | G06F 3/0486 345/168 |
| 2012/0062489 A1* | 3/2012 | Andersson | G06F 3/04883 345/173 |
| 2013/0036387 A1* | 2/2013 | Murata | G06F 3/04883 715/841 |
| 2014/0195961 A1* | 7/2014 | Shoemaker | G06F 3/0483 715/776 |
| 2015/0143294 A1* | 5/2015 | Piccinato | G06F 3/0482 715/817 |

* cited by examiner

*Primary Examiner* — Phuong Nguyen

(57) ABSTRACT

Techniques for spread and pinch gestures are described. A spread gesture can be recognized effective to cause an item to be duplicated. In implementations, the spread gesture includes at least two inputs that select the item and spread apart to increase a distance between the two inputs. The item is divided into two substantially identical items in response to the distance between the two inputs exceeding a distance threshold. A pinch gesture can also be recognized effective to cause one or more items to be removed from a display of items. In implementations, the pinch gesture includes two or more inputs that select and drag two non-adjacent items toward one another to decrease a distance between the two non-adjacent items. The one or more items that are between the two non-adjacent items are removed from the display based on recognition of the pinch gesture.

20 Claims, 9 Drawing Sheets

SPREAD-TO-DUPLICATE AND PINCH-TO-DELETE GESTURES

BACKGROUND

Conventional techniques used for duplicating or deleting an item that is displayed on a display device using touch screen functionality can be complex, requiring several navigational steps and/or user inputs. These steps can involve accessing a menu and/or searching for one or more commands in the menu, such as copy and paste. Consequently, these steps can be difficult to remember for some users, and navigation can be complex and difficult to manage on some devices such as small-interface touchscreen devices.

SUMMARY

Techniques for spread-to-duplicate and pinch-to-delete gestures are described. In one or more embodiments, a spread gesture can be recognized effective to cause an item to be duplicated. In implementations, the spread-to-duplicate gesture can include at least two inputs that select the item and spread apart to increase a distance between the two inputs. The item is divided into two substantially identical items in response to the distance between the two inputs exceeding a distance threshold.

In embodiments, a pinch-to-delete gesture can be recognized effective to cause an item to be removed from a display of items. In implementations, the pinch-to-delete gesture includes two or more inputs that select and drag two non-adjacent items toward one another to decrease a distance between the two non-adjacent items. The item (or items) that are between the two non-adjacent items are removed from the display based on recognition of the pinch-to-delete gesture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
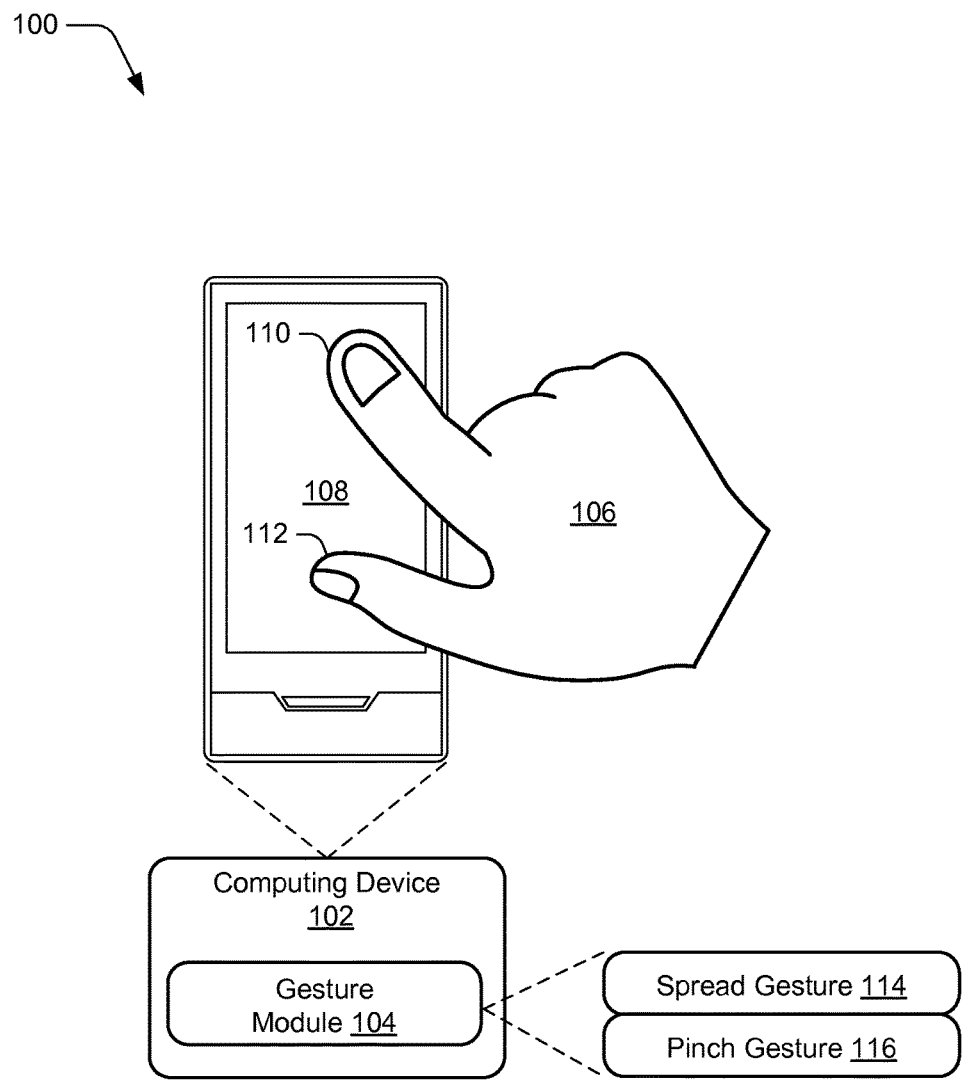
FIG. 1 is an illustration of an environment in an example implementation that is operable to implement techniques for spread-to-duplicate and pinch-to-delete gestures.

Conventional techniques used for duplicating or deleting an object displayed on a display device using touch screen functionality can be complex, involving several navigational steps and/or multi-step gestures. For example, a touch screen on a mobile device can be used to enter an input such as an input to cause duplication or deletion of an item. A user may touch the touch screen using a finger to select an item. The user may then access a menu or toolbar to locate and initiate commands to copy and paste, or delete the item.

Techniques involving spread-to-duplicate and pinch-to-delete gestures are described. In the following discussion, a variety of different implementations are described that involve simple, easy-to-remember and use gestures for duplicating and/or deleting an item. In one example, a user can use two fingers to input, via a touch screen, a single-step gesture to duplicate or delete an item in a list of items.

As used herein, the term "gesture" may refer to one or more touch inputs, such as one or more fingers of a user's hand proximate a display device of a computing device using touchscreen functionality. The touch input may be recognized as including attributes (e.g., movement, selection point, size, etc.) that are usable to differentiate the touch input from other touch inputs. This differentiation may then serve as a basis to identify a gesture from the touch input and consequently an operation that is to be performed based on the identification of the gesture.

As used herein, a "spread-to-duplicate gesture" may define a gesture that includes two touch inputs that select an item and which are repositioned to increase a distance between the two inputs. The spread-to-duplicate gesture can be effective to cause the item to be duplicated. The spread-to-duplicate gesture may also be referred to herein as a "spread" gesture that initiates a duplication action.

A "pinch-to-delete gesture" may be recognized as two or more touch inputs that select two non-adjacent items and which are repositioned to decrease a distance between the two or more inputs. For example, the user may pinch two fingers that are contacting the display device closer together to decrease the distance between the two touch inputs. The pinch-to-delete gesture may also be referred to herein as a "pinch" gesture that initiates a deletion action. Further discussion of these gestures is provided below.

As used herein, the term "item" is representative of an object that is displayable via a display device. An object is representative of a location in memory having a value and referenced by an identifier. An object can be a data structure, a variable, a function, an instance of a class, a table, a column, an association between data and a database entity, and so on. Some examples of objects can include files, text, images, audio data, video data, audio/video data, and so on. Other examples of objects include items, such as items in a table, a column, a list of items, and so on. Thus, the term "item" can represent any of a variety of objects.

In the following discussion, an example environment is first described that may employ the techniques described herein. Following this, example implementations are described that utilize the techniques described herein for spread gestures. Example procedures for spread gestures are then described which may be performed in the example environment as well as other environments. Subsequently, example implementations are described that utilize the techniques described herein for pinch gestures. Example procedures for pinch gestures are then described which may be performed in the example environments as well as other environments. Consequently, performance of the example procedures is not limited to the example environment and/or the example implementations, and the example environment and/or the example implementations are not limited to performance of the example procedures.

Example Environment

FIG. 1 is an illustration of an environment 100 in an example implementation that is operable to use techniques described herein. The illustrated environment 100 includes an example of a computing device 102 that may be configured in a variety of ways. For example, the computing device 102 may be configured as a desktop computer, a laptop computer, a mobile device (e.g., assuming a handheld configuration such as a tablet or mobile phone), and so forth. Thus, the computing devices may range from full resource devices with substantial memory and processor resources (e.g., personal computers, game consoles) to a low-resource device with limited memory and/or processing resources (e.g., mobile devices). The computing device 102 may also relate to software that causes the computing device 102 to perform one or more operations.

The computing device 102 is illustrated as including a gesture module 104. The gesture module 104 is representative of functionality to identify gestures and cause operations to be performed that correspond to the gestures. The gestures may be identified by the gesture module 104 in a variety of ways. For example, the gesture module 104 can be configured to recognize a touch input, such as a finger of a user's hand 106 as proximate a display device 108 of the computing device 102 using touchscreen functionality. As used herein, the finger of the user's hand 106 may refer to any of the user's fingers or thumb on the user's hand 106.

Additionally, the gesture module 104 can be configured to recognize multiple touch inputs, such as the user's index finger 110 and the user's thumb 112 as both proximate the display device 108 of the computing device 102. The multiple touch inputs can be recognized simultaneously or sequentially. For example, the user may touch the display device with two fingers at the same time, or touch the display device with a first finger and subsequently touch the display device with second finger while the first finger maintains contact with the display device.

The touch input may also be recognized as including attributes (e.g., selection point, movement, etc.) that are usable to differentiate the touch input from other touch inputs recognized by the gesture module 104. This differentiation may then serve as a basis to identify a gesture from the touch inputs and consequently an operation that is to be performed based on the identification of the gesture. A variety of different types of gestures may be recognized by the gesture module 104, such as gestures that are recognized from a single type of input (e.g., touch gestures that include an interrupt such as the user's finger lifting off of the display device 108) as well as gestures involving multiple types of inputs.

Accordingly, the gesture module 104 may support a variety of different gestures. Examples of gestures described herein include a spread gesture 114 (e.g., a spread-to-duplicate gesture) and a pinch gesture 116 (e.g., a pinch-to-delete gesture). Each of these gestures is described in further detail below.

Example Implementations for Spread Gestures

The following discussion describes example graphical user interfaces (GUIs) that can be employed to perform various aspects of techniques discussed herein in accordance with one or more embodiments. The example GUIs may be employed in the environment 100 of FIG. 1, the system 900 of FIG. 9, and/or any other suitable environment.

Figure 2:
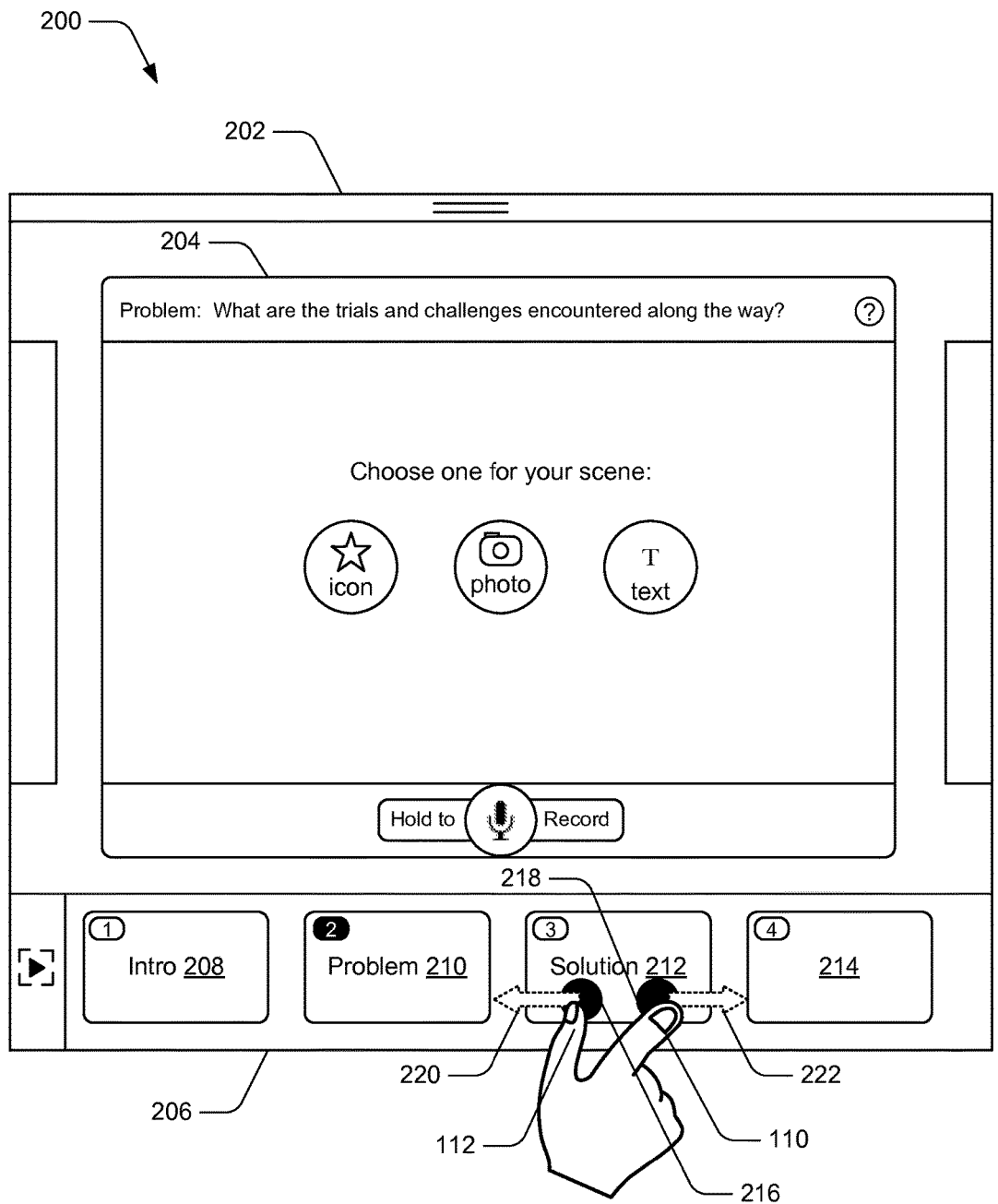
FIG. 2 is an illustration of an example implementation in which techniques for spread-to-duplicate gestures are used in accordance with one or more embodiments.

FIG. 2 is an illustration of an example graphical user interface (GUI) 200 that can be used according to various embodiments discussed herein. For example, the GUI 200 may be implemented by the gesture module 104 of FIG. 1 to provide a visual feedback associated with one or more gestures received via a touch screen device. The GUI 200 illustrates an example presentation-building application 202 having a content area 204 and a navigation area 206. The content area 204 can include a variety of content, such as a document, a web page, an audio file, a presentation slide, a spreadsheet, a folder, and so on. The navigation area 206 can include one or more objects, such as items 208, 210, 212, and 214.

The items 208, 210, 212, and 214 can be selectable to navigate the content displayable in the content area 204. For example, the content displayed in the content area 204 corresponds to item 210, as indicated by the highlighted "2" that represents a location of the item 210 in an ordered list of items. The other items 208, 212, and 214 are selectable to cause different content to be displayed in the content area 204. In some embodiments, the navigation area 206 can include one or more items that represent locations outside of the content displayed in the content area 204, such as a link to other locations or a folder located in a different directory.

In at least one embodiment, a user may initiate contact with a display device using touch screen functionality to input one or more gestures. In the example illustrated in GUI 200, a user may initiate contact with the display device to select the item 212 in the navigation area 206 of the user interface 202. The user may contact the display device with two fingers, such as the user's index finger 110 and the user's thumb 112. It should be recognized that any suitable input item may be used to provide touch inputs via the display device. Some examples of input items may include a finger, a hand, a stylus, or any other suitable item that is usable to provide an input via a display device using touch screen functionality.

In at least some embodiments, a spread gesture can be recognized effective to cause an item to be duplicated. For example, two inputs can be used to select an item displayed in the user interface. In at least one embodiment, the user may use two fingers to select the item, such as fingers 110 and 112 selecting item 212 by generating touch inputs 216 and 218. For illustration, the touch inputs 216 and 218 are represented by black circles. The user may then spread the two fingers apart to increase a distance between the two inputs 216 and 218, as is illustrated by arrows 220 and 222.

Figure 3:
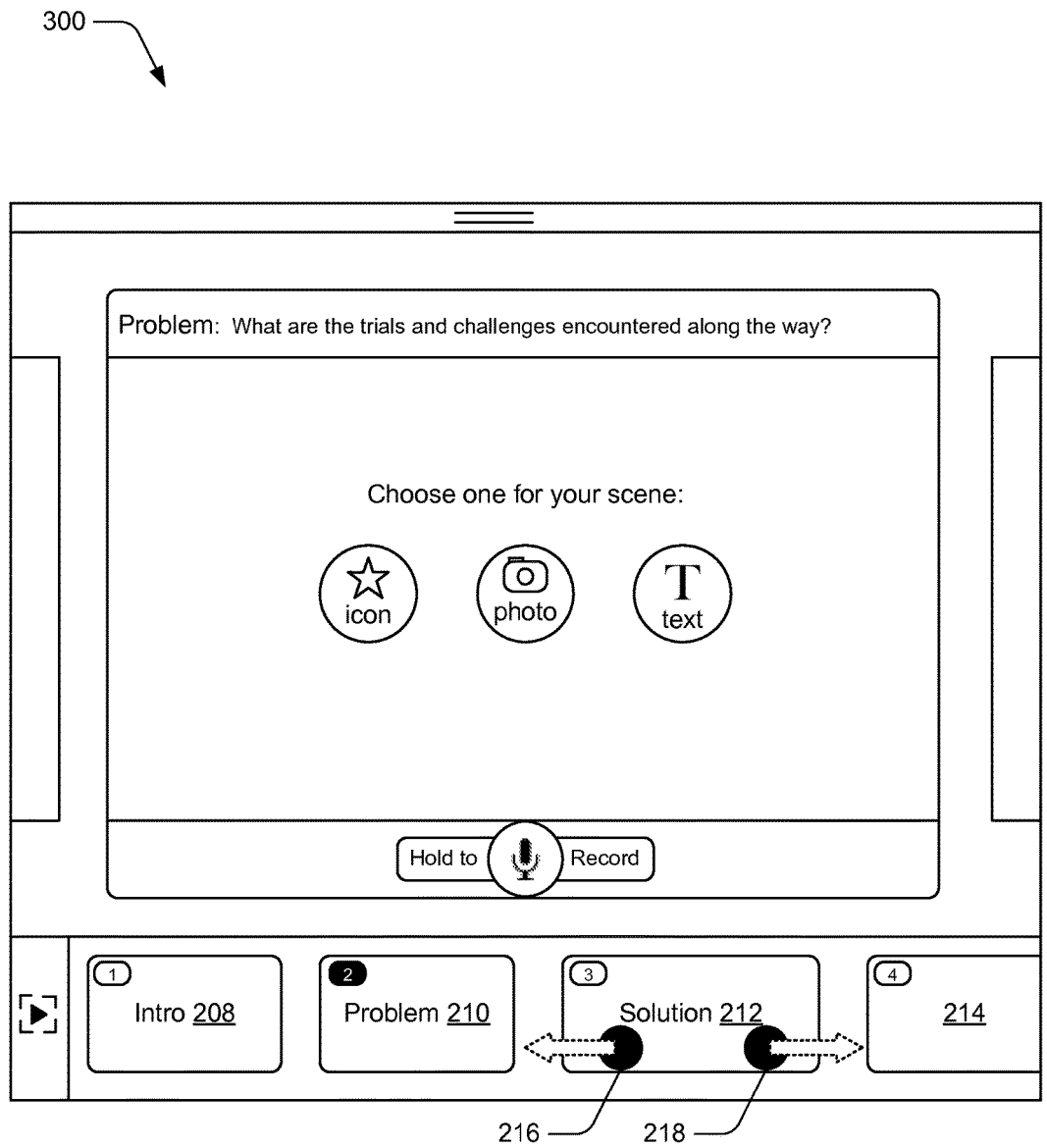
FIG. 3 is an illustration of an example implementation in which techniques for spread-to-duplicate gestures are used to stretch an item in accordance with one or more embodiments.

FIG. 3 illustrates an example GUI 300 that can be used according to various embodiments discussed herein. In some embodiments, when the inputs are spread apart to increase the distance between the inputs, the selected item 212 is visually stretched. For instance, the item 212 can be elongated along an axis that is substantially parallel to an axis connecting the two inputs. Alternatively, the item 212 can be stretched along a longitudinal axis of a list of items that includes the item 212.

The distance between the inputs can be monitored to determine whether the distance exceeds a predetermined threshold. Any suitable threshold may be utilized, such as a distance threshold that defines a distance between the inputs and/or defines an amount of increase of the distance between the inputs. The item 212 may be visually stretched until the threshold is exceeded, as is described in FIG. 4.

Figure 4:
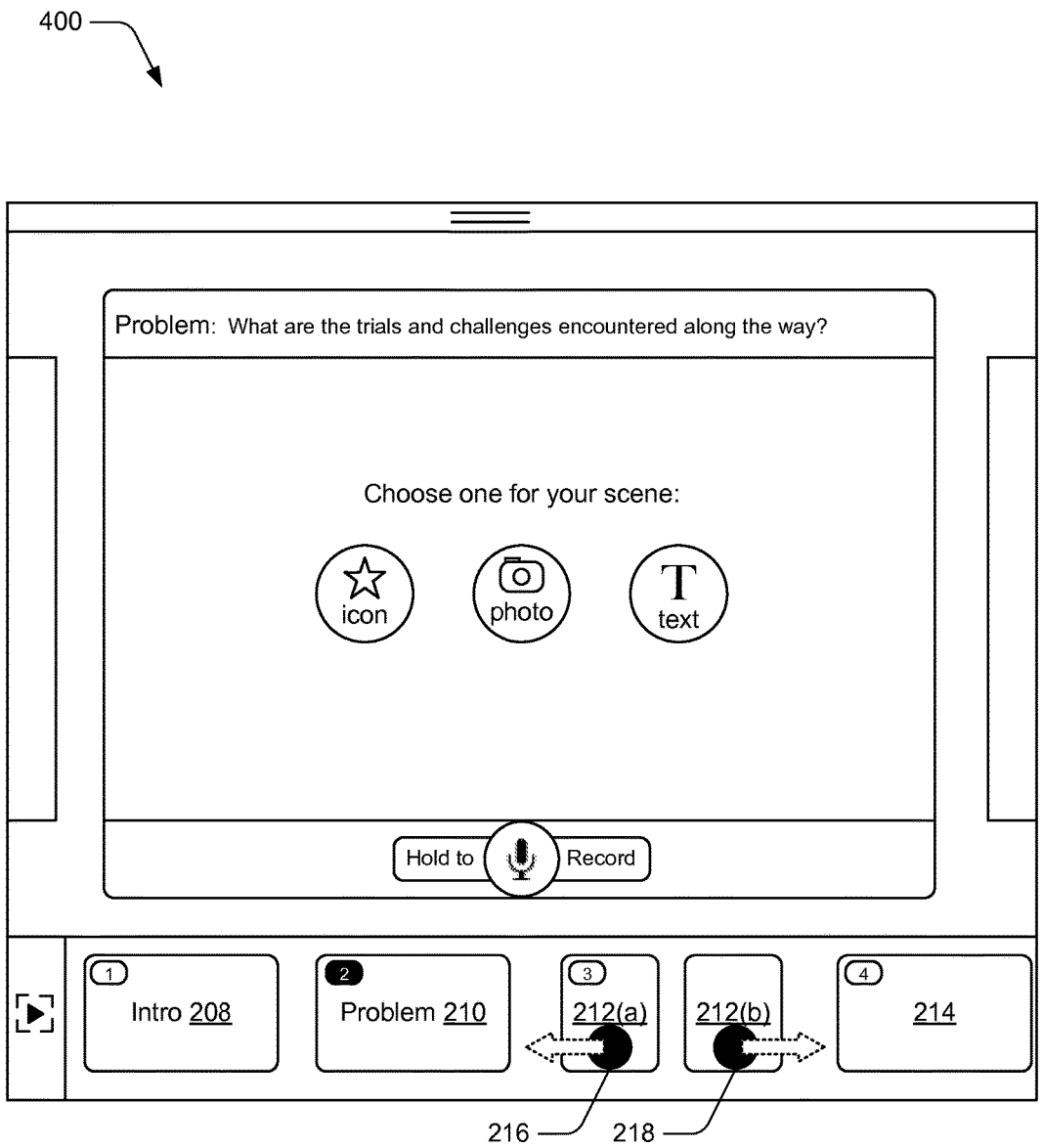
FIG. 4 is an illustration of an example implementation in which techniques for spread-to-duplicate gestures are used to duplicate an item in accordance with one or more embodiments.

FIG. 4 illustrates an example GUI 400 that can be used according to various embodiments discussed herein. Once the threshold is exceeded, the item 212 is divided into two substantially identical items 212(a) and 212(b). In some embodiments, the two substantially identical items can include the originally selected item and a copy of the item. In implementations, the copy of the item can be placed after the selected item in an ordered list, an example of which is illustrated in FIG. 5.

Figure 5:
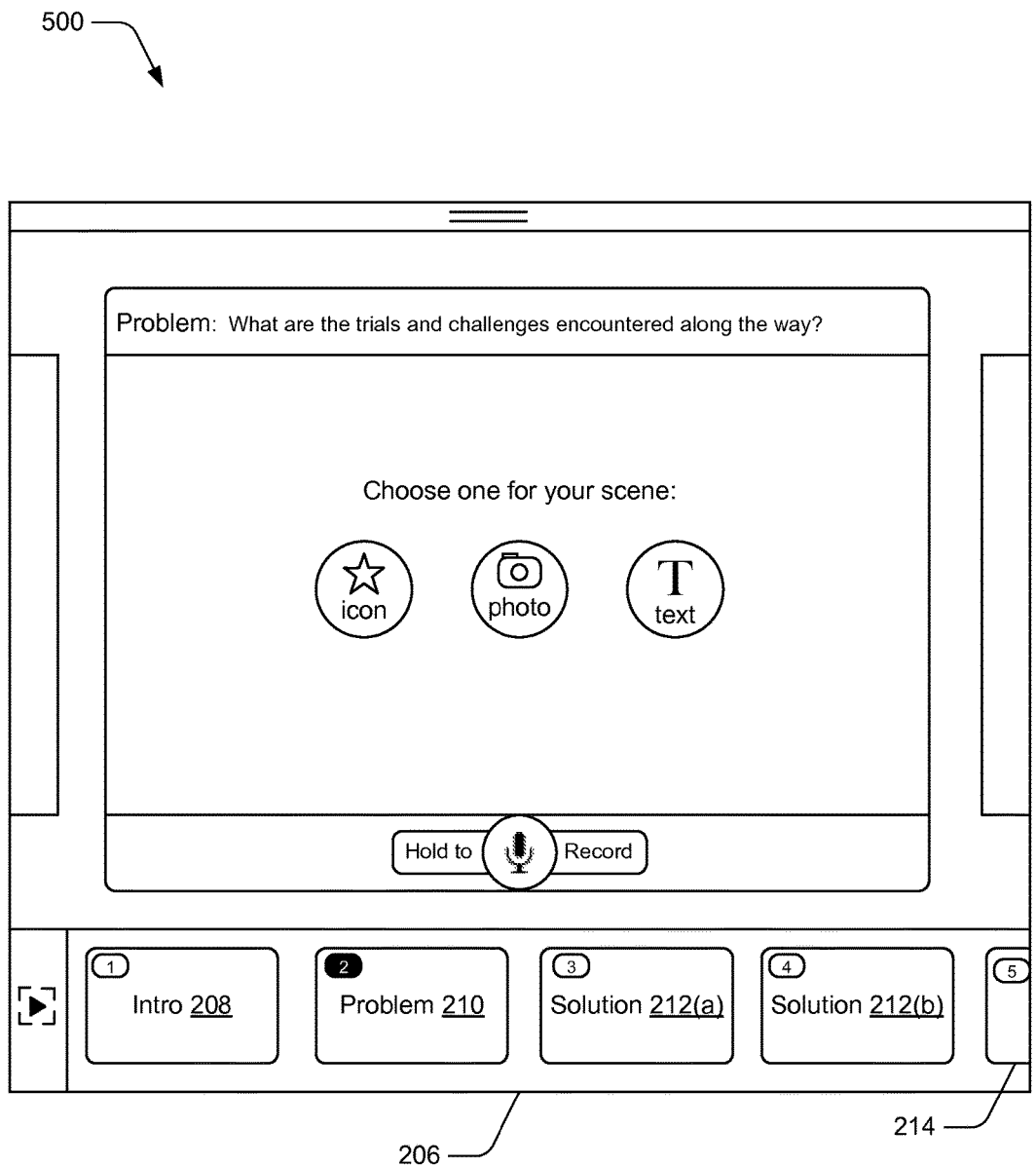
FIG. 5 is an illustration of an example implementation in which techniques for spread-to-duplicate gestures are used in accordance with an ordered list of items.

FIG. 5 illustrates an example GUI 500 that can be used according to various embodiments discussed herein. As mentioned above, the copy 212(b) of the item can be placed after the item 212(a) in an ordered list. For example, prior to the spread gesture, the item 212 was ordered third in the ordered list of items in the navigation area 206 and the next item in the list, item 214, was ordered fourth in the list. When the copy 212(b) of the item is generated, the copy 212(b) of the item is placed after the item 212(a) and numbered fourth in the list. Other items in the list can be reordered to account for a newly added item in the list. For example, item 214 is re-ordered to a fifth position in the list.

Spread Gesture Example Procedures

The following discussion describes techniques for spread gestures that may be implemented according to one or more embodiments. In at least some embodiments, the techniques for spread gestures may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, although various different procedures are described herein, a combination of the described procedures may be used to implement techniques for spread gestures. In portions of the following discussion, reference will be made to the environment 100 of FIG. 1.

Figure 6:
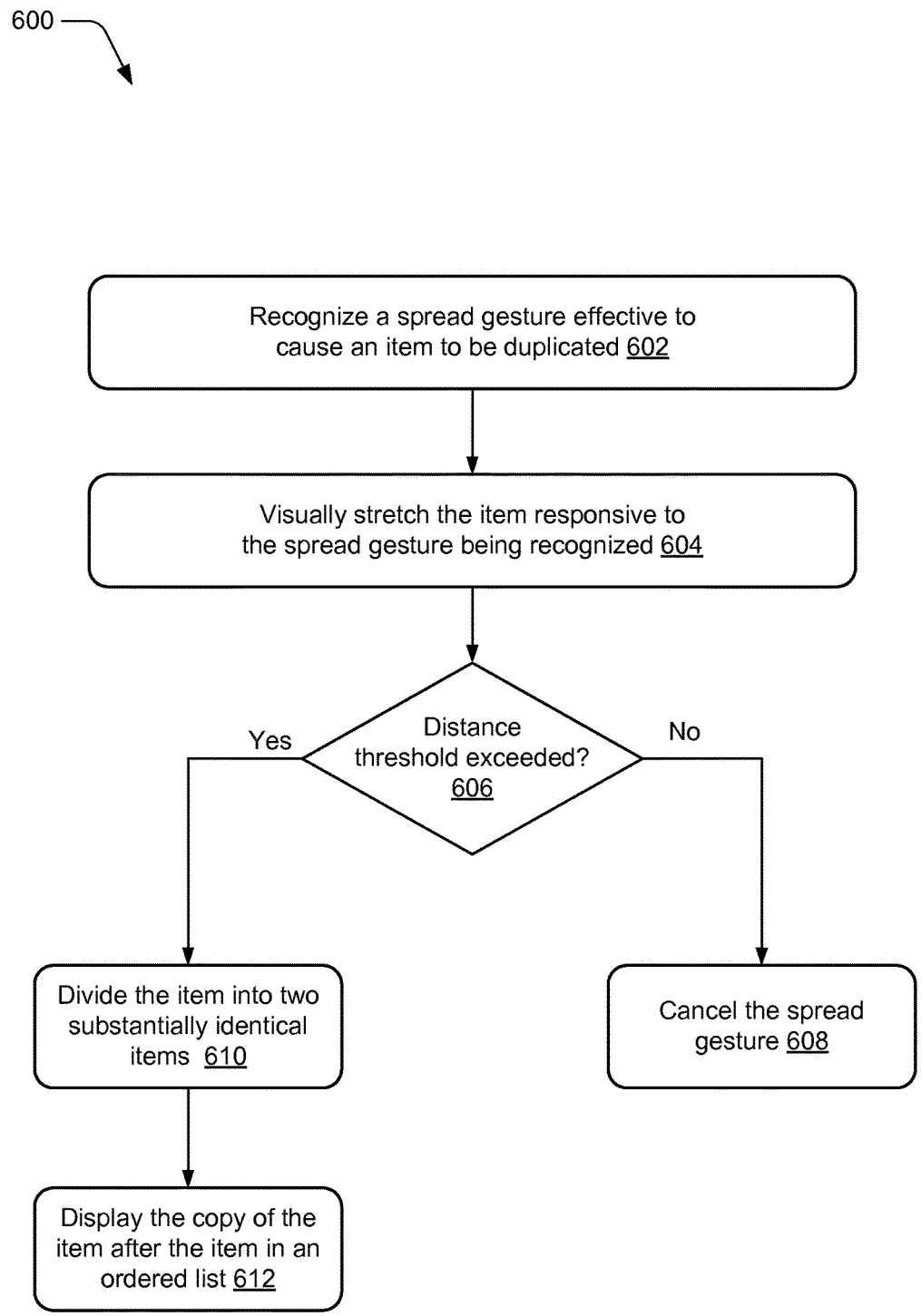
FIG. 6 is a flow diagram depicting a procedure in an example implementation in which spread-to-duplicate gestures are used in accordance with one or more embodiments.

FIG. 6 is a flow diagram depicting a procedure 600 in an example implementation in which spread gestures are employed in accordance with one or more embodiments. A spread gesture is recognized effective to cause an item to be duplicated (block 602). For example, the spread gesture can include at least two inputs that select an item and which are spread apart to increase the distance between the inputs. In at least one embodiment, a user may use two fingers to provide the inputs. Both inputs can be configured to select a single item simultaneously, or approximately simultaneously. The two inputs, however, may be initiated sequentially such that the user's fingers initiate contact with the display device at different times.

The item is visually stretched in response to the spread gesture being recognized (block 604). For example, the item may include an icon, a shape, text, or other image that can be visually stretched to correspond to the spread gesture. The item can be stretched in the same direction as the spread gesture, such as in the same direction as the movement of the inputs. In at least one embodiment, the item can be stretched along an axis that is substantially parallel to an axis connecting the two inputs. Alternatively, the item can be stretched along an axis that is substantially parallel to a longitudinal axis of a list of items that includes the item.

A determination is made as to whether a distance threshold is exceeded (block 606). Any suitable threshold can be utilized. In at least one embodiment, the distance threshold may define a predetermined amount of increase in the distance between the two inputs. For example, when the two inputs are received, the distance between the two inputs can be measured. As the distance between the two inputs is increased, such as by a user spreading the fingers apart, the distance is monitored to determine whether the increase exceeds the threshold.

In some embodiments, the distance threshold may define a predetermined distance between the two inputs such that when the distance between the inputs reaches the predefined distance, the threshold is exceeded. Additionally or alternatively, the distance threshold may be adjustable based on an initial distance between the two inputs. For example, if the initial distance between the two inputs is one centimeter, then the distance threshold can be configured as three centimeters. However, if the initial distance is two centimeters, then the distance threshold can be configured as four centimeters. Accordingly, the distance threshold can be configured in a variety of ways.

If the distance threshold is not exceeded, the spread gesture is canceled (block 608). For example, if an interrupt is received before the distance threshold is reached, then the spread gesture is canceled. In at least one embodiment, the user may remove one or more fingers from contact with the display device, which is received as an interrupt. Alternatively, the user may cease to increase the distance between the inputs and/or begin decreasing the distance between the inputs such as bringing the fingers closer together.

Alternatively, if the distance threshold is exceeded, then the item is divided into two substantially identical items (block 610). For example, the stretched item is divided into two items. The items can include the originally selected item and a copy of the selected item. The copy of the selected item can be generated in any suitable way, such as by the gesture module 104 of FIG. 1.

The copy of the item is displayed after the item in an ordered list (block 612). For example, if the item is included in an ordered list, the copy of the item is generated and placed after the item in the ordered list in response to dividing the item. In some embodiments, the copy of the item can be placed at the end of the ordered list. In addition, other items in the ordered list can be re-ordered based on the addition of the copy of the item to the list.

Example Implementations for Pinch Gestures

The following discussion describes example graphical user interfaces (GUIs) that can be employed to perform various aspects of techniques discussed herein in accordance with one or more embodiments. The example GUIs may be employed in the environment 100 of FIG. 1, the system 900 of FIG. 9, and/or any other suitable environment.

Figure 7:
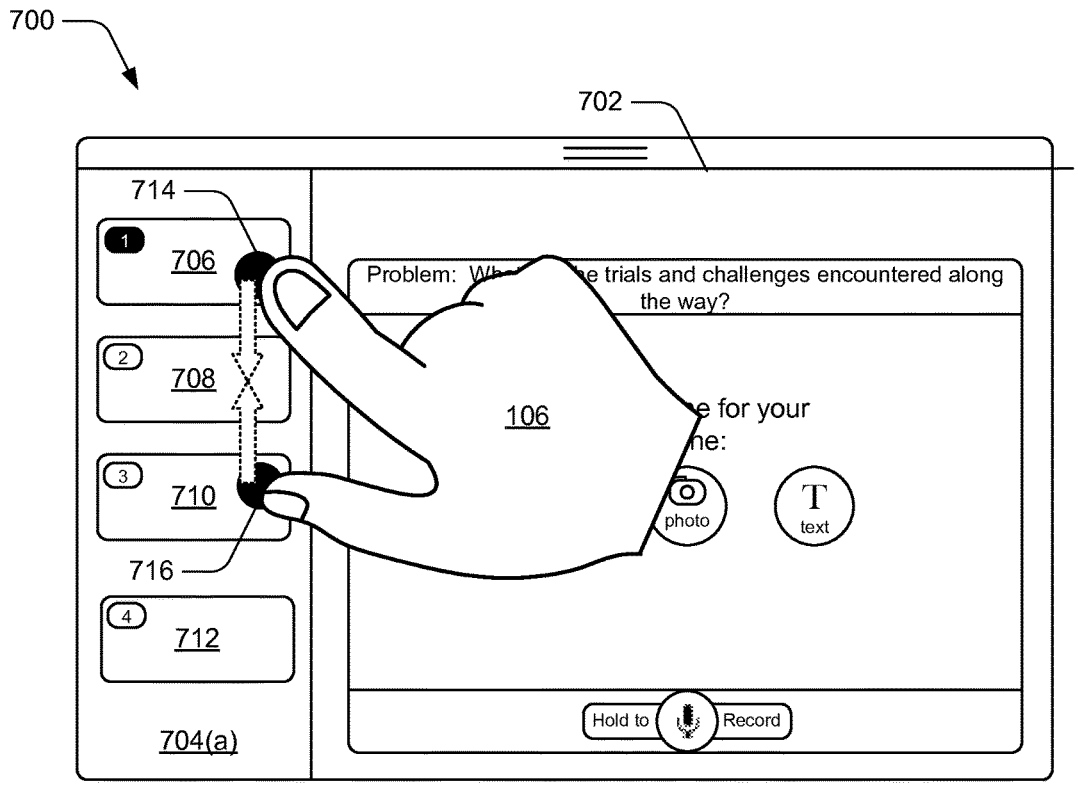
FIG. 7 is an illustration of an example implementation in which techniques for pinch-to-delete gestures are used in accordance with one or more embodiments.
Figure 7:
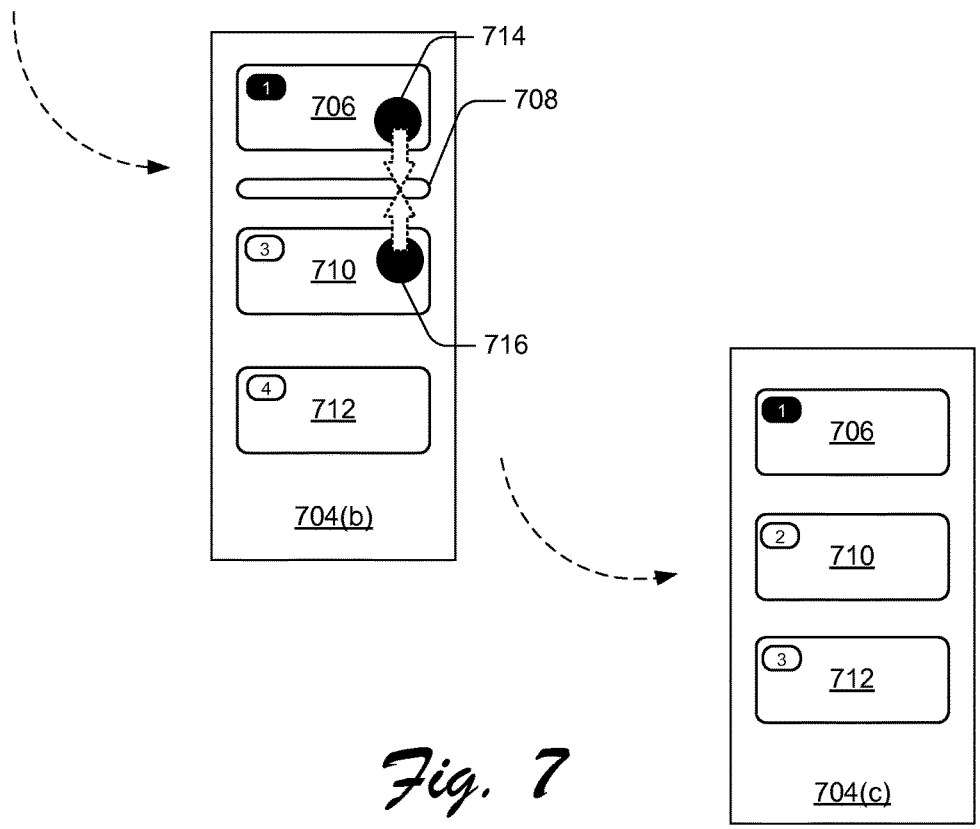

FIG. 7 is an illustration of an example graphical user interface (GUI) 700 that can be used according to various embodiments discussed herein. For example, the GUI 700 may be used by the gesture module 104 of FIG. 1 to provide visual feedback associated with one or more gestures received via a touch screen device. The GUI 700 includes a content area 702 and a navigation area 704(*a*). The content area 702 can include a variety of content, examples of which are described above. The navigation area 704(*a*) can include one or more items, such as items 706, 708, 710, and 712 that are all selectable to navigate the content displayable in the content area 702. In some implementations, the items in the navigation area 704(*a*) can be selectable to cause different content to be displayed in the content area 702.

In at least some embodiments, a user may initiate contact with a display device using touch screen functionality to input one or more gestures. In the example illustrated in GUI 700, the user initiates contact with the display device with two fingers, such as a thumb and an index finger. Any suitable input item may be utilized to provide a touch input via the display device, examples of which are described above.

In some embodiments, a pinch gesture can be recognized effective to cause one or more items to be removed from the display. For example, a user may select two non-adjacent items in a list of items with two fingers, and pinch the two fingers together to remove an item that is between the two selected items. FIG. 7 illustrates a user selecting the item 706 with an index finger and the item 710 with a thumb. For illustration, black circles are used to represent inputs 714 and 716 that are initiated by the finger and thumb, respectively, of the user's hand. Item 708 is currently displayed between items 706 and 710. The user may then move the finger and thumb closer together to decrease the distance between the inputs 714 and 716. The items 706 and 710 can be dragged to correspond to the movement of the inputs 714 and 716.

As the distance between the inputs 714 and 716 decreases, the item 708 that is between the items 706 and 710 is decreased (e.g., shrunk or compressed) in size. An example is illustrated sequentially in FIG. 7 via navigation areas 704(*a*), 704(*b*), and 704(*c*). For example, the user may pinch the items 706 and 710 together in navigation area 704(*a*), as illustrated by the dotted arrows. In response to the pinch gesture, the item 708 is visually altered (e.g., shrunk), as illustrated in navigation area 704(*b*). Alternatively, the item 708 can be decreased in size as the distance between the dragged items 706 and 710 is decreased. Once the distance between the inputs 714 and 716, or between the items 708 and 710, is decreased to exceed a proximity threshold, the item 708 is removed from the display and/or from the list, as illustrated in navigation area 704(*c*). In at least some embodiments, the item 708 may be removed from the display by collapsing the item 708. Additionally, the collapsed item can be maintained in the list in a collapsed state, or removed from the list.

If the collapsed item 708 is removed from the list, the other items in the list may be re-ordered to account for the removed item 708. For example, prior to the pinch gesture, the item 710 was numbered third in the list. Subsequent to removal of the item 708, however, the item 710 is re-numbered and re-ordered to second in the list. Alternatively, the item 710 can be maintained in the third position in the list if the collapsed item 708 is maintained in the list after removal from the display.

Any suitable threshold can be used, such as a proximity threshold that identifies a distance between the inputs 714 and 716 or identifies an amount of decrease in the distance between the inputs 714 and 716. If the proximity threshold is not exceeded before an interrupt is received (e.g., one or more of the user's fingers being removed from contact with the display device), then the pinch gesture is canceled and the item 708 is not removed from the display. In implementations, if the item 708 is visually decreased and the proximity threshold is not exceeded, then the item 708 is restored to an unaltered form.

Example Procedures for Pinch Gestures

The following discussion describes techniques for pinch gestures that may be implemented according to one or more embodiments. In at least some embodiments, the techniques for pinch gestures may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, although various different procedures are described herein, a combination of the described procedures may be employed to implement techniques for pinch gestures. In portions of the following discussion, reference will be made to the environment 100 of FIG. 1.

Figure 8:
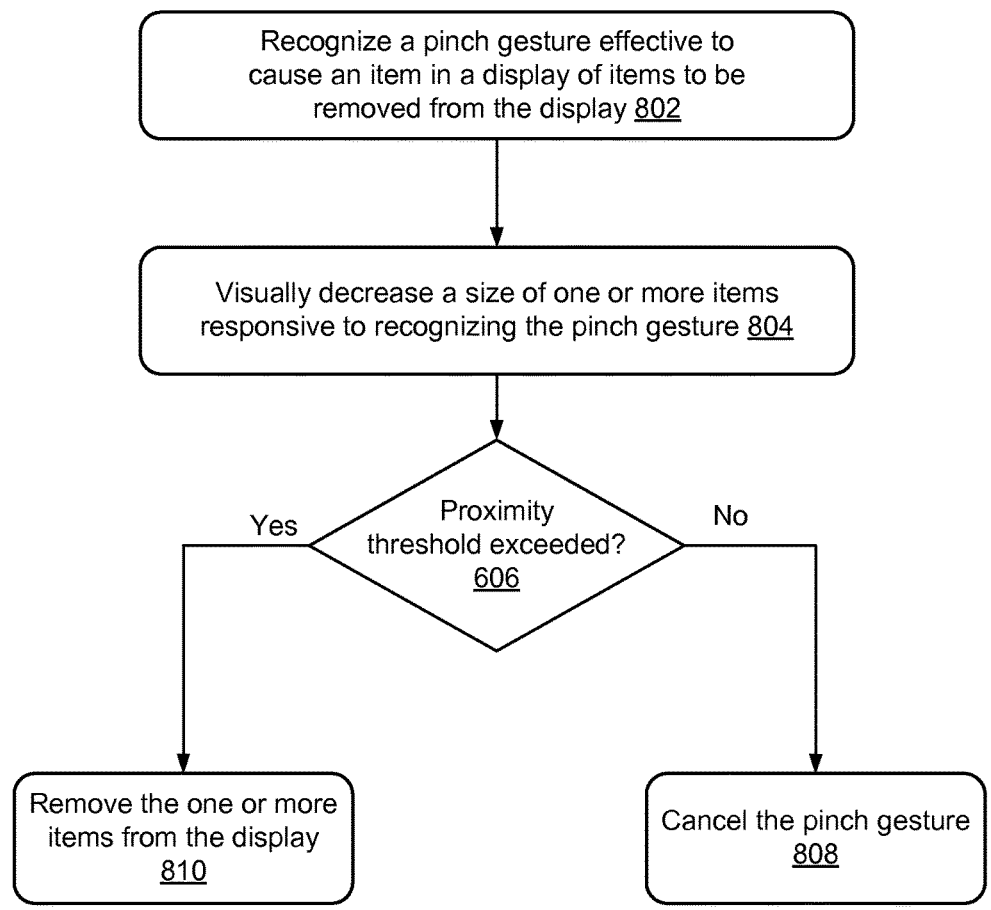
FIG. 8 is a flow diagram depicting a procedure in an example implementation in which pinch-to-delete gestures are used in accordance with one or more embodiments.

FIG. 8 is a flow diagram depicting a procedure 800 in an example implementation in which techniques for pinch gestures are used in accordance with one or more embodiments. A pinch gesture is recognized effective to cause an item in a display of items to be removed from the display (block 802). For example, a pinch gesture is recognized as corresponding to a decrease in distance between two non-adjacent items, or between two inputs that select the two non-adjacent items. In at least some embodiments, the items in the display may be part of a list of items.

One or more items are visually decreased in size responsive to recognizing the pinch gesture (block 804). For example, as the distance between the two non-adjacent items is decreased, one or more items that are between the two non-adjacent items are visually decreased in size. In implementations, multiple items can be between the two non-adjacent items, and each of the multiple items between the two non-adjacent items is decreased in size in response to the recognizing the pinch gesture. In some embodiments, the items that are decreased can be compressed via an axis that is substantially parallel to a longitudinal axis of the list. Alternatively, the items can be compressed along an axis that connects the two inputs.

A determination is made as to whether a proximity threshold is exceeded (block 806). Any suitable threshold can be utilized, examples of which are described above. In at least some embodiments, when the two inputs are received, the distance between the inputs can be measured. Alternatively or additionally, the distance between the two selected non-adjacent items can be measured. As the distance between the two inputs or between the two items is decreased, such as by the user pinching the fingers together, the distance is monitored to determine whether the decrease exceeds the threshold. Alternatively or additionally, the distance is monitored to determine whether a predefined distance is reached between the two inputs. In some embodiments, the threshold can be adjustable based on an initial distance between the two inputs.

If the proximity threshold is not exceeded, then the pinch gesture is canceled (block 808). For example, an interrupt, such as removal of the user's finger from contact with the display device, can be received prior to the pinch gesture reaching the proximity threshold. In such a case, the pinch gesture can be canceled and any decreased items between the two selected items can be restored to their original size.

If the proximity threshold is exceeded, the one or more items are removed from the display (block 810). For example, as the distance between the two selected items is decreased to exceed the proximity threshold, the items that were decreased in size are removed from the display. In at least some embodiments, the decreased items may be visually collapsed. If the items are included in a list of items, the collapsed items can be maintained in the list in a collapsed state. Alternatively, the collapsed items can be removed from the list.

Example System and Device

Figure 9:
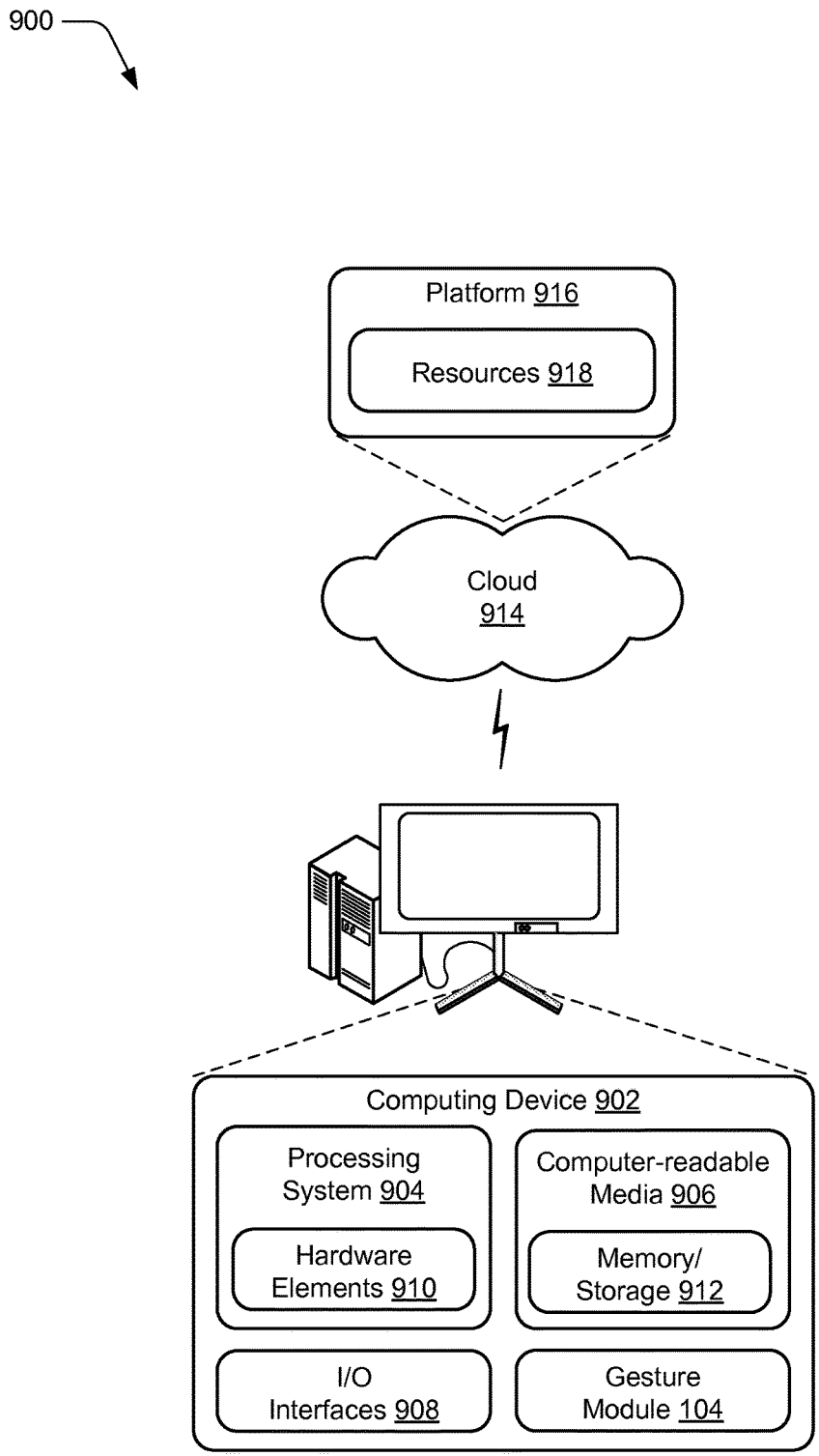
FIG. 9 illustrates various components of an example device that can be implemented as any type of computing device as described with reference to FIG. 1 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of gesture module 104, which may be configured to identify gestures and cause operations to be performed that correspond to the gestures. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

Cloud 914 includes and/or is representative of a platform 916 for resources 918. Platform 916 abstracts underlying functionality of hardware (e.g., servers) and software resources of the cloud 914. Resources 918 may include applications and/or data that can be utilized while computer processing is executed on servers that are remote from the computing device 902. Resources 918 can also include services 920 provided over the Internet and/or through a subscriber network, such as a cellular or Wi-Fi network.

Platform 916 may abstract resources and functions to connect computing device 902 with other computing devices. Platform 916 may also serve to abstract scaling of resources to provide a corresponding level of scale to encountered demand for resources 918 that are implemented via platform 916. Accordingly, in an interconnected device embodiment, implementation of functionality described herein may be distributed throughout system 900. For example, the functionality may be implemented in part on computing device 902 as well as via platform 916 that abstracts the functionality of cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing a spread gesture effective to cause an item to be stretched, the spread gesture comprising at least two touch inputs that together select the item and spread apart to increase a distance between the at least two touch inputs;
   visually stretching the item along an axis connecting the at least two touch inputs to provide a stretched item based on the spread gesture;
   monitoring an amount of increase in the distance between the at least two touch inputs as the at least two touch inputs continue to visually stretch the item;
   responsive to the amount of increase in the distance between the at least two touch inputs exceeding a predetermined amount of increase, dividing the stretched item into two separated substantially identical items that are initially smaller in size than an initial size of the item prior to being stretched; and
   increasing a size of the two separated substantially identical items to match the initial size of the item by positioning one of the two touch inputs on one of the two separated substantially identical items and positioning the other of the two touch inputs on the other of the two separated substantially identical items and increasing a distance along an axis between the at least two touch inputs causing the size increase of the two separated substantially identical items.

2. The method of claim 1, wherein the item is visually stretched prior to the amount of increase in the distance between the at least two inputs reaching the predetermined amount of increase.

3. The method of claim 1, wherein the two separated substantially identical items include the item and a copy of the item.

4. The method of claim 3, wherein the copy of the item is placed after the item in an ordered list of items.

5. The method of claim 1, wherein said recognizing the spread gesture comprises:
   receiving the at least two touch inputs via a display device using touch screen functionality, the at least two touch inputs being individual inputs that each select the item; and
   recognizing the amount of increase in the distance between the two individual inputs until the predetermined amount of increase is exceeded.

6. The method of claim 1, wherein the inputs are received from a user using two fingers.

7. The method of claim 1, wherein the two separated substantially identical items are relatively smaller in size in comparison to the stretched item.

8. The method of claim 1, wherein:
   the item is selectable to navigate content displayable via a display device; and
   the two separated substantially identical items are each selectable to navigate the content.

9. A system comprising:
   a memory configured to store instructions as a gesture module; and
   one or more processors to implement the gesture module that is configured to duplicate an item by at least:
   visually stretching the item in response to a spread gesture to provide a stretched item based on recognition of the spread gesture, the spread gesture recognized as an increase in a distance between a first touch input that selects the item and a second touch input that selects the item;

monitoring an amount of the increase in the distance between the first touch input and the second touch input that continue to visually stretch the item;

dividing the stretched item into at least two separated substantially identical items based on the amount of the increase in the distance between the first touch input and the second touch input exceeding a predetermined amount of increase, the at least two separated substantially identical items being initially smaller in size than an initial size of the item prior to being stretched; and increasing a size of the at least two separated substantially identical items to match the initial size of the item by positioning the first touch input on one of the two separated substantially identical items and positioning the second touch input on the other of the two separated substantially identical items and increasing a distance along an axis between the first and second touch inputs causing the size increase of the two separated substantially identical items.

10. The system of claim 9, wherein the item is included in an ordered list of items that comprises one or more text items.

11. The system of claim 9, wherein the at least two separated substantially identical items comprise the item and a copy of the item.

12. The system of claim 9, wherein:
the item is selectable to navigate content displayable via a display device; and
the two separated substantially identical items are each selectable to navigate the content.

13. The system of claim 9, wherein:
the two separated substantially identical items include the item and a copy of the item;
the item is included in a list of items;
the copy of the item is added to the list of items; and
additional items in the list of items are re-ordered to account for the added copy of the item.

14. Computer-readable storage memory comprising stored instructions that, responsive to execution by one or more processors, cause the one or more processors to perform operations comprising:
visually stretching a selected item having an initial size in response to a spread gesture to provide a stretched item based on recognition of the spread gesture, the stretched item having an elongated size that is relatively greater than the initial size of the selected item, the spread gesture recognized as an increase in a distance between a first touch input that selects the selected item and a second touch input that selects the selected item;

monitoring an amount of the increase in the distance between the first touch input and the second touch input responsive to the spread gesture and the visually stretching the selected item;

responsive to the amount of the increase in the distance between the first touch input and the second touch input exceeding a predetermined amount of increase, dividing the stretched item into at least two separated substantially identical items that are smaller than the initial size of the selected item; and increasing a size of each of the at least two separated substantially identical items to match the initial size of the selected item by positioning the first touch input on one of the two separated substantially identical items and positioning the second touch input on the other of the two separated substantially identical items and increasing a distance along an axis between the first and second touch inputs causing the size increase of the two separated substantially identical items.

15. The computer-readable storage memory of claim 14, wherein the selected item is visually stretched prior to the amount of the increase in the distance between the first touch input and the second touch input reaching the predetermined amount of increase.

16. The computer-readable storage memory of claim 14, wherein the two separated substantially identical items include the selected item and a copy of the selected item.

17. The computer-readable storage memory of claim 16, wherein the copy of the selected item is placed after the selected item in an ordered list of items.

18. The computer-readable storage memory of claim 14, wherein the operations further comprise recognizing the spread gesture based on:
receiving the first touch input and the second touch input via a display device using touch screen functionality, the first touch input and the second touch input being individual inputs that each select the selected item; and
recognizing the amount of increase in the distance between the two individual inputs until the predetermined amount of increase is exceeded.

19. The computer-readable storage memory of claim 14, wherein:
the selected item is selectable to navigate content displayable via a display device; and
the two separated substantially identical items are each selectable to navigate the content.

20. The computer-readable storage memory of claim 14, wherein the first input and the second input are received from a user using two fingers.

* * * * *